US012242666B2

(12) United States Patent
Ibars Martinez et al.

(10) Patent No.: US 12,242,666 B2
(45) Date of Patent: Mar. 4, 2025

(54) ARTIFICIAL REALITY INPUT USING MULTIPLE MODALITIES

(71) Applicant: Meta Platforms Technologies, LLC, Menlo Park, CA (US)

(72) Inventors: Roger Ibars Martinez, Seattle, WA (US); Johnathon Simmons, Seattle, WA (US); Pol Pla I Conesa, Portland, OR (US); Nathan Aschenbach, Seattle, WA (US); Aaron Faucher, Seattle, WA (US); Chris Rojas, Seattle, WA (US); Emron Jackson Henry, Duvall, WA (US); Bryan Sparks, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/716,456

(22) Filed: Apr. 8, 2022

(65) Prior Publication Data
US 2023/0324986 A1 Oct. 12, 2023

(51) Int. Cl.
*G06F 3/01* (2006.01)
*G06F 3/04883* (2022.01)
*G06F 3/04886* (2022.01)

(52) U.S. Cl.
CPC .......... *G06F 3/013* (2013.01); *G06F 3/04883* (2013.01); *G06F 3/04886* (2013.01)

(58) Field of Classification Search
None
See application file for complete search history.

(56) References Cited

U.S. PATENT DOCUMENTS 6,204,828 B1 * 3/2001 Amir ................ G06F 3/013
345/157
9,182,826 B2 11/2015 Powledge et al.
(Continued)

FOREIGN PATENT DOCUMENTS

WO 2017192177 A1 11/2017
WO 2018213801 A1 11/2018

OTHER PUBLICATIONS

Adhikary J., "Text Entry in VR and Introducing Speech and Gestures in VR Text Entry," MobileHCI 2018 Workshop on Socio-Technical Aspects of Text Entry, Sep. 3, 2018, 3 pages.
(Continued)

*Primary Examiner* — William L Bashore
*Assistant Examiner* — Gabriel Mercado
(74) *Attorney, Agent, or Firm* — Potomac Law Group, PLLC; Dannon G. Allbee

(57) ABSTRACT

Aspects of the disclosure are directed to an interface for receiving input using multiple modalities in an artificial reality environment. The interface can be a virtual keyboard displayed in an artificial reality environment that includes characters arranged as elements. Implementations include an artificial reality device/system for displaying the artificial reality environment and receiving user input in a first modality, and a controller device for receiving user input in an additional input modality. For example, the artificial reality system can be configured to receive user gaze input as a first input modality and the controller device can be configured to receive input in a second modality, such as touch input received at a trackpad. An interface manager can process input in the multiple modalities to control an indicator on the virtual interface. The interface manager can also resolve character selections from the virtual interface according to the input.

20 Claims, 12 Drawing Sheets

(56) References Cited

U.S. PATENT DOCUMENTS

| | | | |
|---|---|---|---|
| 10,275,023 | B2 | 4/2019 | McKenzie et al. |
| 10,976,804 | B1 | 4/2021 | Atlas et al. |
| 11,023,035 | B1 | 6/2021 | Atlas et al. |
| 11,023,036 | B1 | 6/2021 | Atlas et al. |
| 11,061,372 | B1 | 7/2021 | Chen et al. |
| 2006/0095867 | A1* | 5/2006 | Rogalski ............... G06F 3/0481 715/858 |
| 2006/0250372 | A1* | 11/2006 | Lii .................... G06F 3/041661 345/173 |
| 2007/0245259 | A1 | 10/2007 | Carlson |
| 2010/0241998 | A1* | 9/2010 | Latta ....................... G06F 3/011 715/862 |
| 2012/0326961 | A1 | 12/2012 | Bromer |
| 2013/0249942 | A1 | 9/2013 | Green et al. |
| 2013/0257751 | A1 | 10/2013 | Stafford |
| 2013/0283213 | A1 | 10/2013 | Guendelman et al. |
| 2013/0293580 | A1 | 11/2013 | Spivack |
| 2014/0028567 | A1 | 1/2014 | Park et al. |
| 2014/0078043 | A1 | 3/2014 | Kim |
| 2014/0078176 | A1 | 3/2014 | Kim et al. |
| 2014/0152558 | A1 | 6/2014 | Salter et al. |
| 2014/0248950 | A1 | 9/2014 | Tosas Bautista |
| 2014/0337370 | A1 | 11/2014 | Aravamudan et al. |
| 2015/0205494 | A1 | 7/2015 | Scott et al. |
| 2015/0258432 | A1 | 9/2015 | Stafford et al. |
| 2015/0301740 | A1* | 10/2015 | Bozzini ................. G06F 3/0486 715/773 |
| 2016/0054791 | A1 | 2/2016 | Mullins et al. |
| 2016/0077734 | A1 | 3/2016 | Buxton et al. |
| 2016/0093105 | A1 | 3/2016 | Rimon et al. |
| 2016/0110093 | A1 | 4/2016 | S et al. |
| 2016/0196692 | A1 | 7/2016 | Kjallstrom et al. |
| 2016/0216761 | A1* | 7/2016 | Klingström ............. G06F 3/014 |
| 2016/0274790 | A1* | 9/2016 | Li ......................... G06F 1/1692 |
| 2016/0314624 | A1 | 10/2016 | Li et al. |
| 2017/0160815 | A1 | 6/2017 | Glazier et al. |
| 2017/0228922 | A1 | 8/2017 | Kaeser et al. |
| 2017/0322623 | A1* | 11/2017 | McKenzie .......... G06F 3/04886 |
| 2017/0325901 | A1 | 11/2017 | Harlev et al. |
| 2017/0336882 | A1 | 11/2017 | Tome et al. |
| 2017/0364144 | A1 | 12/2017 | Petrov |
| 2018/0005438 | A1 | 1/2018 | Mathey-Owens et al. |
| 2018/0113669 | A1 | 4/2018 | Szeto |
| 2018/0158250 | A1 | 6/2018 | Yamamoto et al. |
| 2018/0173323 | A1 | 6/2018 | Harvey et al. |
| 2019/0004622 | A1 | 1/2019 | O'Brien et al. |
| 2019/0034076 | A1 | 1/2019 | Vinayak et al. |
| 2019/0065026 | A1 | 2/2019 | Kiemele et al. |
| 2019/0146219 | A1 | 5/2019 | Rodriguez, II |
| 2019/0340821 | A1 | 11/2019 | Chen et al. |
| 2019/0362557 | A1* | 11/2019 | Lacey ........................ G06T 5/20 |
| 2020/0218488 | A1* | 7/2020 | Nguyen .............. G06F 3/03547 |
| 2020/0387287 | A1 | 12/2020 | Ravasz et al. |
| 2021/0011556 | A1 | 1/2021 | Atlas et al. |
| 2021/0099565 | A1 | 4/2021 | Sansanwal et al. |
| 2021/0104100 | A1* | 4/2021 | Whitney ............ G02B 27/0172 |
| 2021/0247900 | A1 | 8/2021 | Richardson et al. |
| 2021/0407203 | A1 | 12/2021 | Canberk et al. |
| 2022/0101613 | A1 | 3/2022 | Rockel |
| 2022/0121344 | A1 | 4/2022 | Pastrana Vicente et al. |
| 2023/0324992 | A1 | 10/2023 | Ibars Martinez et al. |
| 2023/0324997 | A1 | 10/2023 | Faucher et al. |
| 2024/0004542 | A1* | 1/2024 | Krishnamurthy ....... G06F 3/017 |
| 2024/0338086 | A1 | 10/2024 | Faucher et al. |

OTHER PUBLICATIONS

International Search Report and Written Opinion for International Application No. PCT/US2023/017991, mailed Jun. 30, 2023, 10 pages.

International Search Report and Written Opinion for International Application No. PCT/US2023/018032, mailed Jul. 17, 2023, 10 pages.

Jiang H., et al., "PinchText: One-Handed Text Entry Technique Combining Pinch Gestures and Hand Positions for Head-Mounted Displays," International Journal of Human-Computer Interaction, Aug. 29, 2022, 18 pages.

Jimenez J.G., et al., "Continuous-Motion Text Input in Virtual Reality," University of California, Jan. 2018, 6 pages.

Pfeuffer K., et al., "Gaze and Touch Interaction on Tablets," User Interface Software and Technology, Oct. 16, 2016, pp. 301-311.

Sperber M., et al., "Efficient Speech Transcription through Respeaking," Karlsruhe Institute of Technology, Institute of Anthropomatics, Nov. 12, 2023, 5 pages.

Advisory Action mailed May 3, 2021 for U.S. Appl. No. 16/506,618, filed Jul. 9, 2019, 3 pages.

Ex Parte Quayle mailed Jun. 12, 2020 for U.S. Appl. No. 16/506,183, filed Jul. 9, 2019, 13 Pages.

Final Office Action mailed Dec. 2, 2021 for U.S. Appl. No. 16/506,618, filed Jul. 9, 2019, 26 Pages.

Final Office Action mailed Feb. 24, 2021 for U.S. Appl. No. 16/506,618, filed Jul. 9, 2019, 25 Pages.

Non-Final Office Action mailed Sep. 3, 2020 for U.S. Appl. No. 16/506,618, filed Jul. 9, 2019, 23 Pages.

Non-Final Office Action mailed Jun. 10, 2020 for U.S. Appl. No. 16/506,172, filed Jul. 9, 2019, 22 Pages.

Non-Final Office Action mailed Jun. 16, 2021 for U.S. Appl. No. 16/506,618, filed Jul. 9, 2019, 24 Pages.

Non-Final Office Action mailed May 29, 2020 for U.S. Appl. No. 16/506,158, filed Jul. 9, 2019, 24 Pages.

Notice of Allowance mailed Dec. 4, 2020 for U.S. Appl. No. 16/506,183, filed Jul. 9, 2019, 9 pages.

Notice of Allowance mailed Oct. 21, 2020 for U.S. Appl. No. 16/506,158, filed Jul. 9, 2019, 9 pages.

Notice of Allowance mailed Oct. 26, 2020 for U.S. Appl. No. 16/506,172, filed Jul. 9, 2019, 9 Pages.

Notice of Allowance mailed Feb. 3, 2021 for U.S. Appl. No. 16/506,158, filed Jul. 9, 2019, 9 pages.

Notice of Allowance mailed Aug. 31, 2020 for U.S. Appl. No. 16/506,183, filed Jul. 9, 2019, 8 Pages.

Notice of Allowance mailed Feb. 5, 2021 for U.S. Appl. No. 16/506,172, filed Jul. 9, 2019, 9 Pages.

Response to Ex Parte Quayle Action mailed Jun. 12, 2020 for U.S. Appl. No. 16/506/183, filed Jul. 9, 2019, 18 Pages.

Response to Office Action mailed Dec. 3, 2020 for U.S. Appl. No. 16/506,618, filed Jul. 9, 2019, 13 pages.

Response to Office Action mailed Jun. 10, 2020 for U.S Appl. No. 16/506,172, filed Jul. 9, 2019, 16 Pages.

Response to Office Action mailed Oct. 18, 2021 for U.S. Appl. No. 16/506,618, filed Jul. 9, 2019, 5 pages.

Response to Office Action mailed Apr. 22, 2021 for U.S. Appl. No. 16/506,618, filed Jul. 9, 2019, 11 pages.

Response to Office Action mailed Aug. 31, 2020 for U.S Appl. No. 16/506,158, filed Jul. 9, 2019, 18 Pages.

Tosas M., "AR-Pinboard: An Augmented Reality (AR) Virtual Pinboard," Kickstarter [Online], Oct. 16, 2014 [Retrieved on Oct. 15, 2019], 32 pages, Retrieved from the Internet: URL: https://www.Kickstarter.com/projects/1477538513/ar-pinboard-an-augmented-reality-ar-virtual-pinboa/ref=kicktraq.

International Preliminary Report on Patentability for International Application No. PCT/US2023/017991, mailed Oct. 17, 2024, 8 pages.

International Preliminary Report on Patentability for International Application No. PCT/US2023/018032, mailed Oct. 24, 2024, 9 pages.

\* cited by examiner

ARTIFICIAL REALITY INPUT USING MULTIPLE MODALITIES

TECHNICAL FIELD

The present disclosure is directed to a virtual interface for receiving input using multiple modalities in an artificial reality environment.

BACKGROUND

Artificial reality devices provide opportunities for users to experience artificial reality, augmented reality, and/or virtual reality. However, user interactions in these environments have continued to present challenges. Often, user input is inaccurate or slow, causing user frustration. User input can take many forms, such as tracked motion, eye gaze, touch, joystick, and the like. This variety of input presents challenges to match implemented functionality with a user's expected functionality. Moreover, the different input opportunities present ergonomic challenges as well, as certain types of user input can cause fatigue overtime or can otherwise be uncomfortable for the user.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
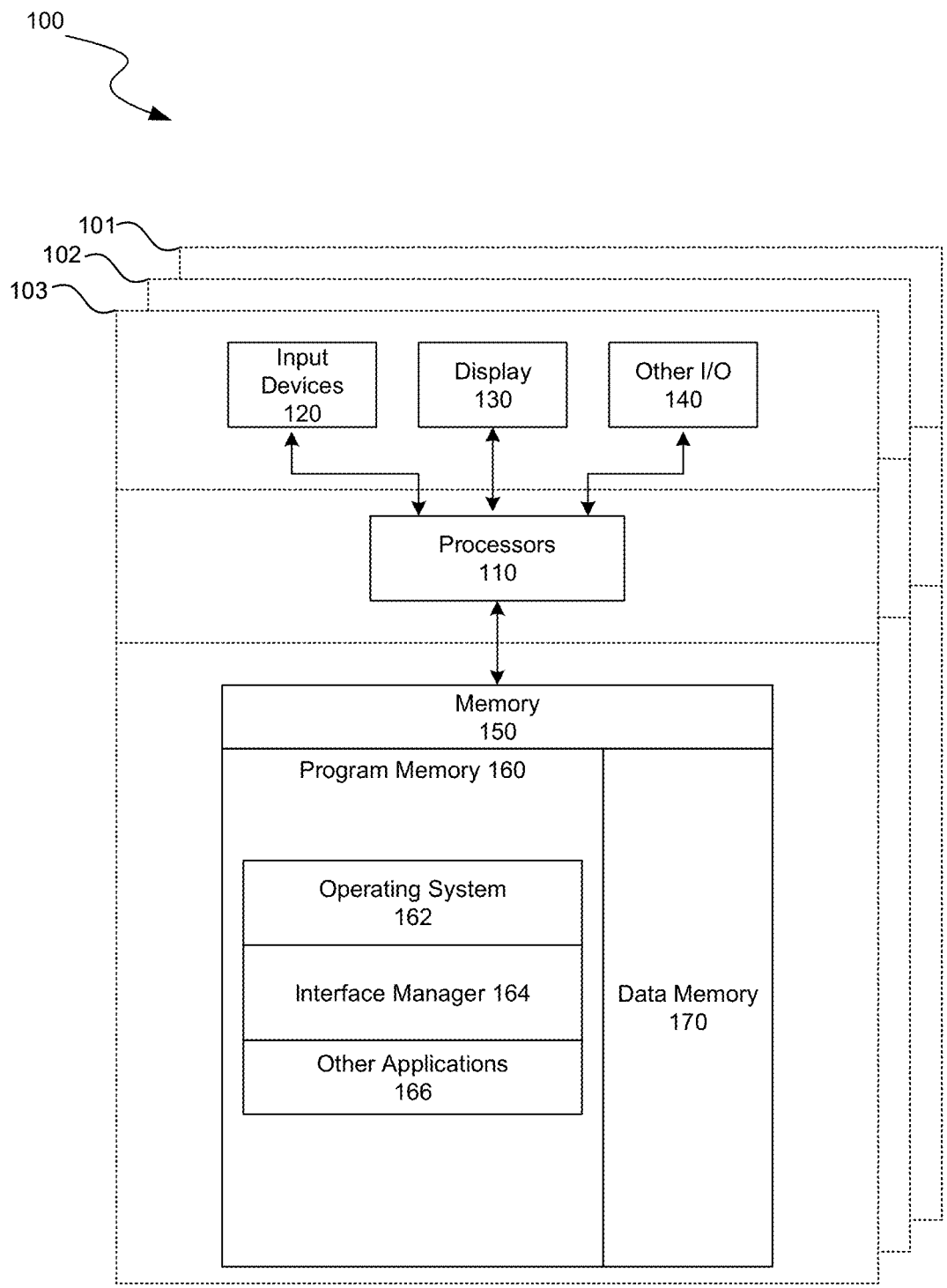
FIG. 1 is a block diagram illustrating an overview of devices on which some implementations of the present technology can operate.

Aspects of the present disclosure are directed to an interface for receiving input using multiple modalities in an artificial reality environment. For example, the interface can be a virtual keyboard displayed in an artificial reality environment that includes alphanumeric characters arranged as elements. Implementations include an artificial reality device/system for displaying the artificial reality environment and receiving user input in a modality, and a controller device for receiving user input in an additional input modality. For example, the artificial reality device and/or system can be configured to receive gaze input as a first input modality. The controller device can be configured to receive input in a second modality, such as touch input received at a trackpad. An interface manager can process input in the multiple modalities to dynamically move a cursor on the virtual interface. The interface manager can also resolve character selections, a word, or other suitable alphanumeric character combination(s) according to the input.

The interface manager initiates a mapping between user hand input and a cursor location at the virtual keyboard according to the user's gaze input. For example, the interface manager can display/dynamically move a cursor according to the user's input in the multiple modalities. Where the controller device includes a trackpad, prior to detecting the user's touch on the trackpad, the interface manager can: a) dynamically move the cursor according to the user's gaze input, b) display the cursor in a default location until touch input is detected, c) not display the cursor until touch input is detected, or d) a combination thereof.

When the interface manager detects trackpad input, the interface manager can initiate a mapping between the location of the initial touch input on the trackpad and an initial placement of the cursor on the virtual keyboard. The interface manager can place/display the cursor at a location on the virtual keyboard according to the user's gaze at the time of the detected trackpad input. The interface manager can then dynamically move the cursor (according to the touch input) from this initial location. In some implementations, an element selector can resolve a first element (e.g., alphanumeric character) selection according to the user's gaze input proximate in time to the initial touch input.

The trackpad is configured to receive touch input as a swipe segment in some implementations. The swipe segment can include a starting point and a finishing point. In an example, the interface manager can map the starting point of a first swipe segment to the placed indicator (in some implementations, at the first selection resolved using the user's gaze input). For example, a start of the touch input at the trackpad initiates the mapping between the trackpad and the indicator. The user's swipe input is sensed by the touchpad as touch input (e.g., sensed touch between two or more points) and the interface manager dynamically moves the cursor from its initial placement according to the touch input. In some implementations, when an end of the touch input at the trackpad is detected, the interface manager terminates the mapping between the touch input at the trackpad and the indicator at the virtual keyboard.

The interface manager can also detect when trackpad input is received at the edge of the trackpad. For example, an edge boundary can be defined for the trackpad (e.g., predefined) and the interface manager can detect when touch input is located at the edge boundary. Because a user cannot continue a swipe in the direction past the trackpad edge, the interface manager can dynamically move the indicator (e.g., at a constant motion) according to a vector when edge input is detected. For example, the vector can be determined according to the location of the edge input relative to the trackpad, the touch input proximate to the edge input (e.g., swipe direction prior to the edge), or a combination of these.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Conventional XR input interfaces fail to provide experiences that meet user expectations, can cause fatigue and/or strain, and fail to deliver reliable/accurate results. For example, the conventional XR collider virtual keyboards can track user hand movements and identify when a hand movement collides with a virtual keyboard element. However, this conventional technique can cause hand/arm fatigue, provides poor input speeds, and does not support use cases in a public setting. Another conventional XR keyboard can track user gaze to select each character from the virtual keyboard. However, this conventional technique can cause eye strain, also provides poor input speeds, and produces relatively low accuracy/reliability.

Implementations of the disclosed technology are expected to overcome these deficiencies in conventional systems by combining inputs from multiple modalities to support an improved user experience for interacting with an XR input interface. For example, user gaze input can be used to place an indicator on a virtual keyboard and to initiate a mapping between a controller device (e.g., trackpad) and the indicator on the virtual keyboard. The mapping can be used to control the indicator on the virtual keyboard according to hand input received at the controller device (e.g., touch/swipe input at a trackpad). The hand input can then be resolved to generate element combination(s) (e.g., words, numbers, or other character combinations).

The use of user gaze input to place the indicator on the virtual keyboard and hand input to select the elements on the virtual keyboard according to the placed indicator mitigates the risk of eye strain. This is at least because hand input (e.g., trackpad input) can cause less user fatigue than gaze input when interacting with a virtual keyboard. Further, these combined input modalities also increase speed of character selection and accuracy/reliability of character selection. The swipe-based character selection can permit users to "type" on a virtual keyboard with a natural and ergonomic feel, which can result in increased speed and accuracy.

Further, the use of user gaze to place an indicator on the virtual keyboard improves the natural feel of the virtual interface, without requiring a display device to be integrated with the trackpad input device and eliminating the delay that would be caused by requiring a user to lift and look at a keyboard displayed on the trackpad input device. Implementations that resolve a first character selection according to user gaze input further support these improvements.

Prior to interacting with a controller device (e.g., interacting with a trackpad via touch) the user's relationship with the XR display is often based on where the user is looking (e.g., user gaze). Mapping the trackpad touch to the user's gaze provide a natural transition from gaze-based XR interactions to trackpad XR interactions (e.g., or mixed gaze and trackpad XR interactions). This is advantageous over placing an indicator at a predetermined location when touch input is initiated, as the predetermined location can cause a friction point that feels unnatural when the user's gaze is elsewhere. Further, the benefit of this more natural input is realized with hardware that is easier to interact with and less costly to produce than a touchpad device with a display.

Several implementations are discussed below in more detail in reference to the figures. FIG. 1 is a block diagram illustrating an overview of devices on which some implementations of the disclosed technology can operate. The devices can comprise hardware components of a computing system 100 that receives input using multiple modalities in an augmented reality environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, interface manager 164, and other application programs 166. Memory 150 can also include data memory 170 that can include, e.g., language model data, data representative of stored swipe patterns associated with characters, historical data, training data, mapping data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
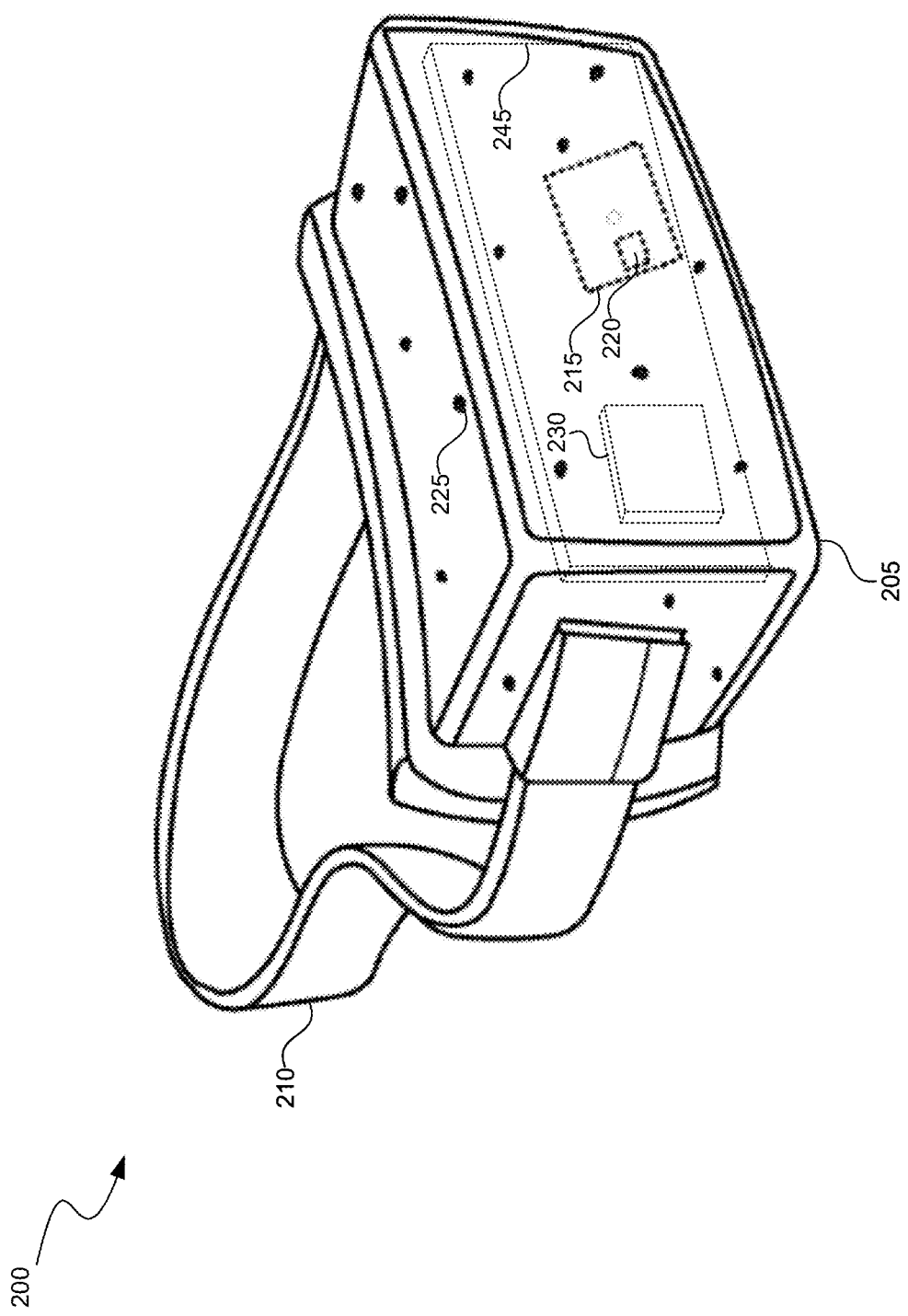
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
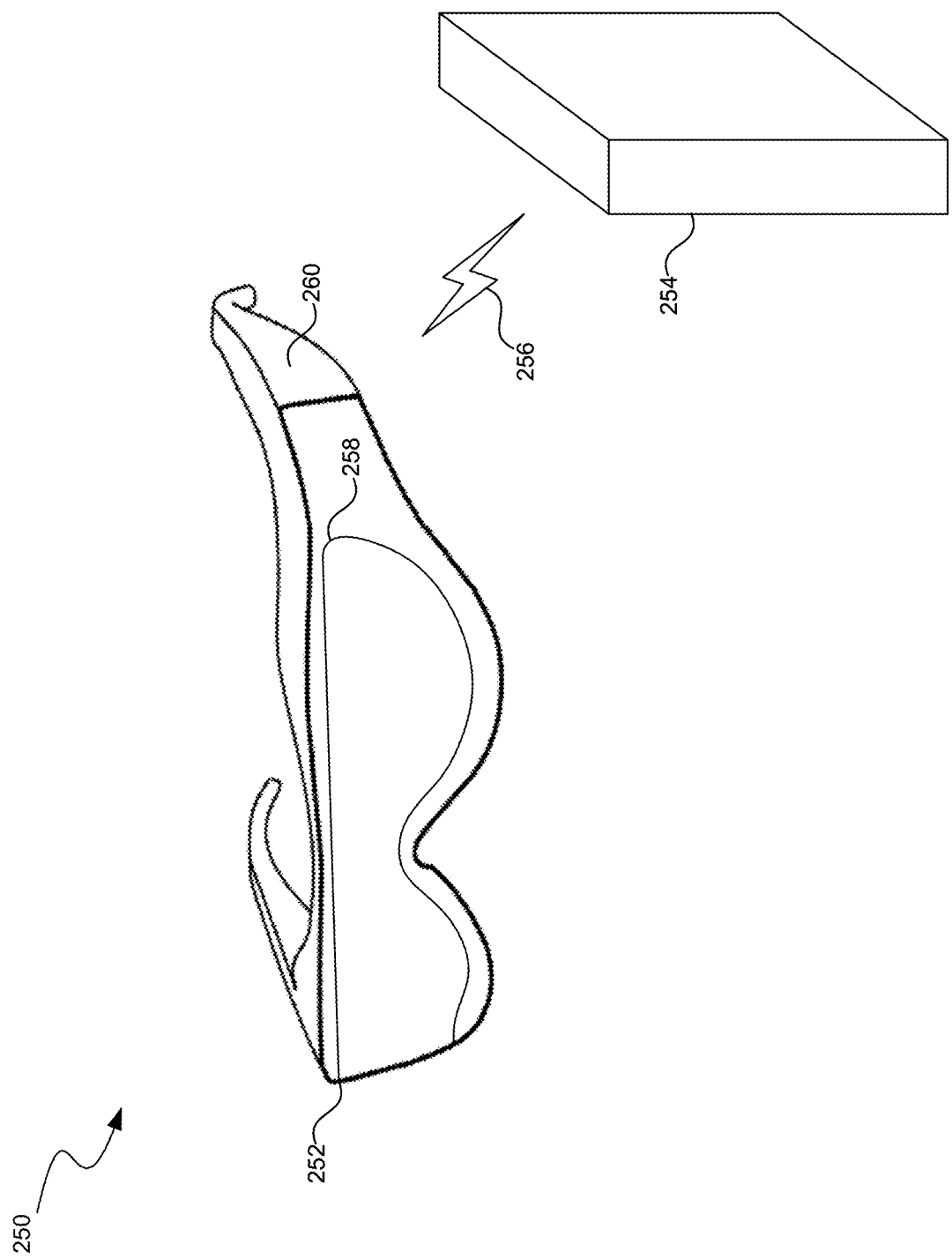
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
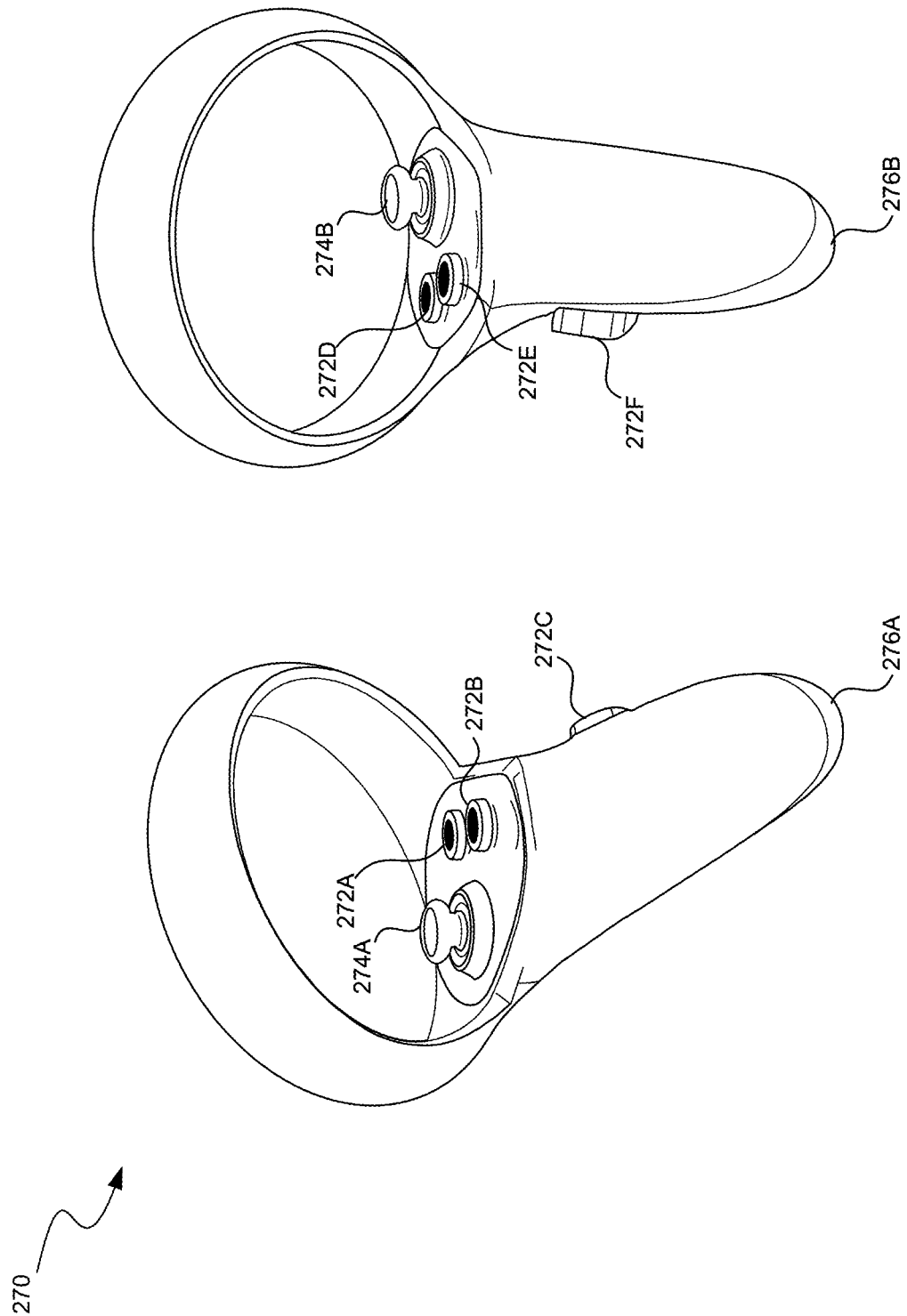
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
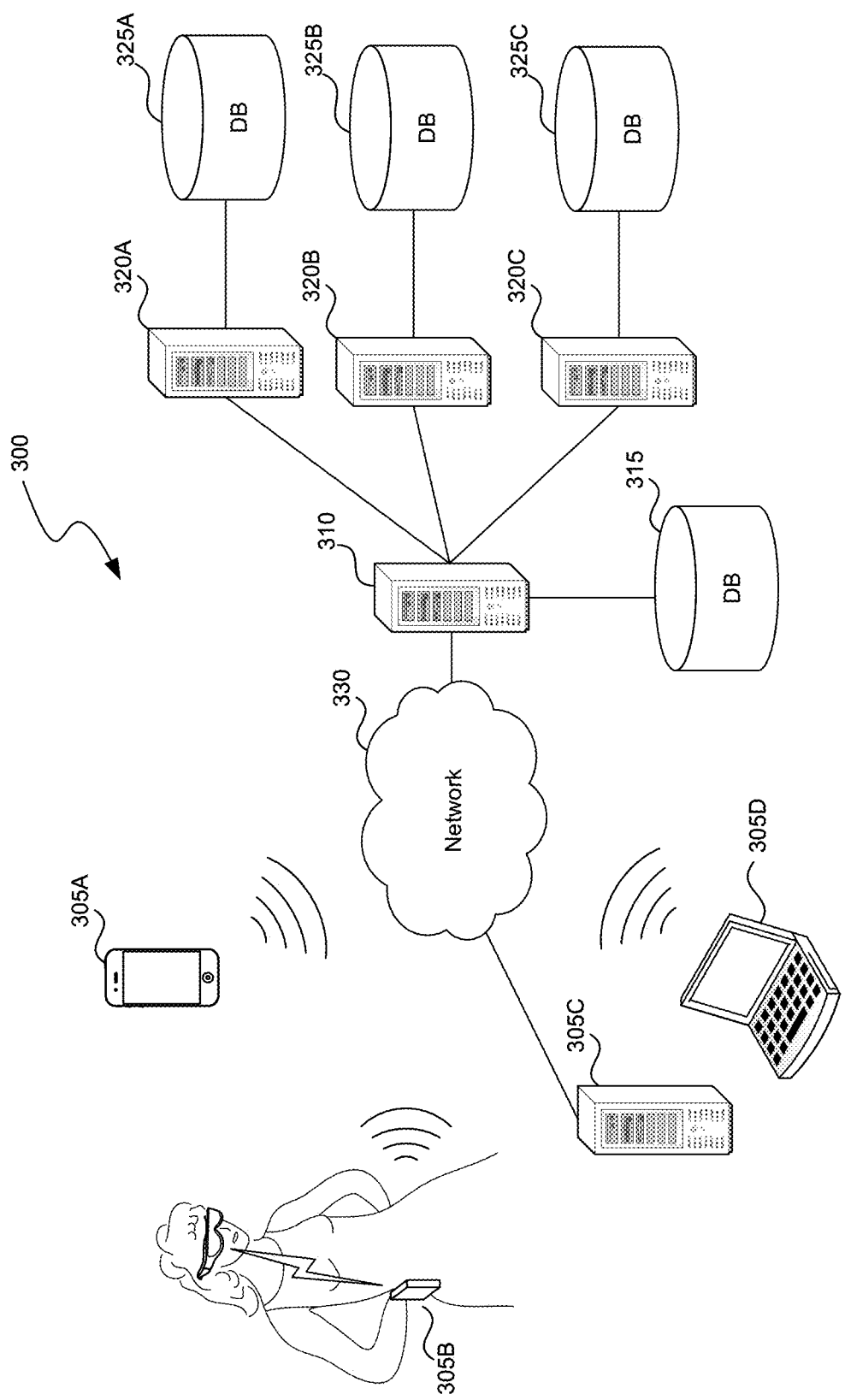
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
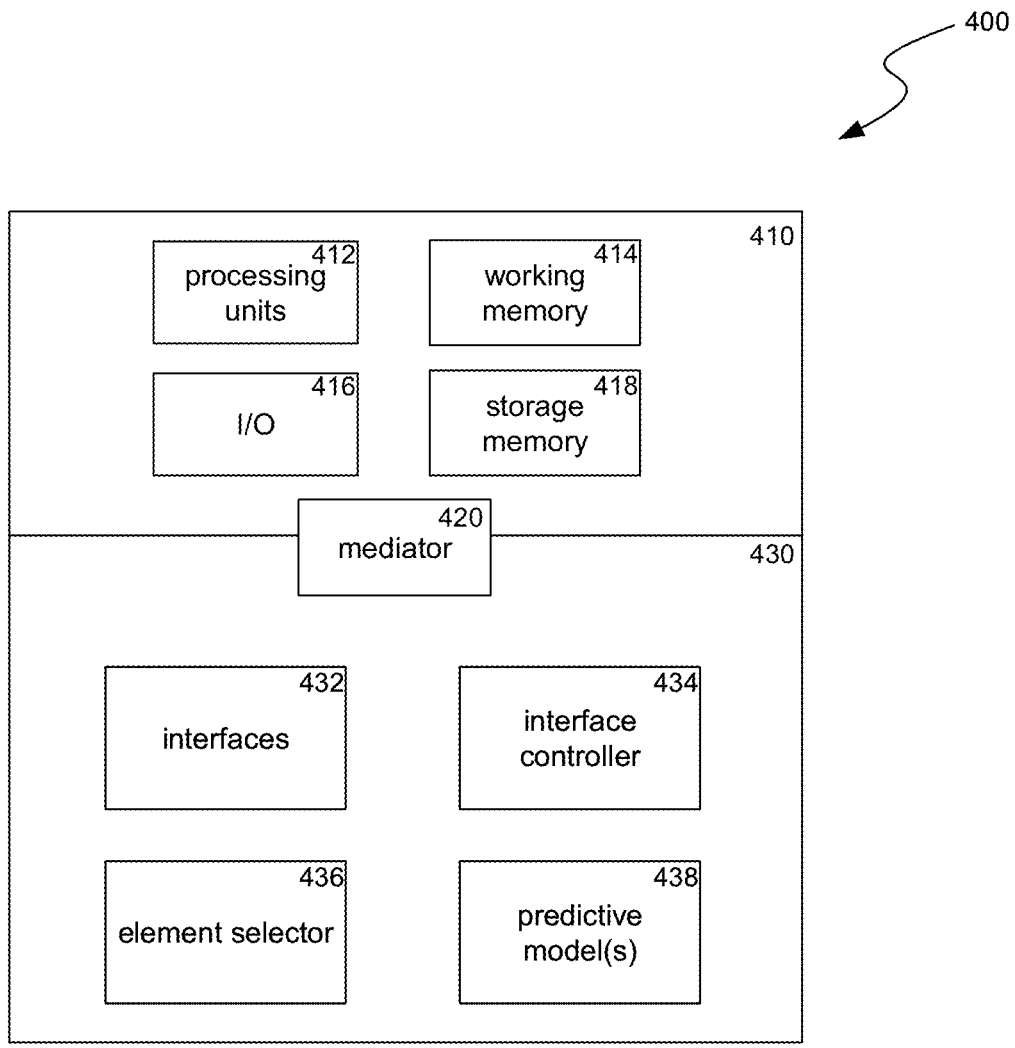
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416

(e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for receiving input using multiple modalities in an XR environment. Specialized components 430 can include interface controller 434, element selector 436, predictive model(s) 438, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Interface controller 434 can control an interface displayed in the XR environment. For example, the interface can be a virtual keyboard and interface controller 434 can control indicator placement/movement at the virtual keyboard using input from multiple modalities. Interface controller 434 receives user input in a combination of input modalities, such as gaze input and trackpad input, gaze input and joystick input, gaze input and tracked hand input, or any other suitable combination(s) of modalities.

Gaze input can be tracked using one or more sensors, such as camera(s), accelerometers, other wearable sensors, or other suitable sensors. In some implementations, input from multiple cameras, wearable sensors, and/or other sensors can be combined to track the user's head state. The tracked head state can include head motion, direction the head is pointed, eye motion, direction eyes are looking (e.g., eye gaze), and other suitable head states and motions. One or more machine learning models can be configured to track the user's head and/or eye state, such as a computer vision model that includes a convolutional neural network or any other suitable model. In some implementations, the model can include a 3D model of the user's eye(s), and the machine learning model can take image data depicting the user's eye (e.g., showing glints around the cornea) which the machine learning model uses to estimate a direction of the eye (relative to the user's head) in the 3D model. Thus, the machine learning model(s) can be trained to receive input from a camera (e.g., a sequence of images) and/or other sensors, and output a head state/eye gaze for the user.

Tracked hand input can be tracked using one or more sensors, such as camera(s), accelerometers, or other suitable sensors. In some implementations, input from multiple cameras, wearable sensors, and/or other sensors can be combined to track the user's body state. The tracked body state can include hand motion, finger motion, arm motion (e.g., forearm motion, wrist motion, etc.), and other suitable body states or motion. One or more machine learning models can be configured to track the user's body state, such as a computer vision model that includes a convolutional neural network or any other suitable model. The machine learning model(s) can be trained to receive input from a camera (e.g., a sequence of images) and/or other sensors, and output body states/tracked hand motion and position for the user.

Trackpad input and joystick input can be received using suitable controller devices, such as a trackpad configured to detect/sense a user's touch or a joystick with a moveable component or a component that can sense force. Interface controller 434 can receive input from these different modalities and place/move a cursor on the virtual keyboard according to the input.

Interface controller 434 can place a cursor on the virtual keyboard according to the user gaze input modality. For example, interface controller 434 can resolve a particular location on the displayed virtual keyboard according to the tracked user gaze input (e.g., projected gaze ray) at a given point in time, place the cursor at the resolved location, and display the placed cursor to the user on the virtual keyboard. For example, the resolved location on the virtual keyboard according to the user gaze input can be the point (e.g., two-dimensional coordinates on the virtual keyboard) at which a projected gaze ray intersects the displayed virtual keyboard, or the location can be resolved using any other suitable technique. In some implementations, element selector 436 can resolve a first selected alphanumeric character from a virtual keyboard according to tracked user gaze input, and interface controller 434 can place the cursor at/proximate to the selected alphanumeric character.

In some implementations, interface controller 434 places the cursor in response to initial touch input received at the trackpad of a controller device (or initiation of any other suitable hand input). For example, the initial touch input can be part of a swipe pattern received at the trackpad. The start of the swipe pattern initiates a mapping between the placed cursor and the trackpad location where the initial touch is received. Interface controller 434 can then dynamically move the cursor from the initial placed location according to the swipe pattern received at the trackpad. For example, interface controller 434 can then receive the user's swipe touch input as touch input between two or more coordinates and can dynamically move the placed cursor according to the swipe touch input. Interface controller 434 can display the dynamic movement of the cursor to the user on the virtual keyboard.

Element selector 436 resolves selected elements from the virtual interface (e.g., virtual keyboard) according to received input. In some implementations, element selector 436 can resolve alphanumeric characters, a word, and/or combination of characters according to received input in a modality associated with a user's hand input. For example, a trackpad can receive a user's touch input in the form of a swipe, a joystick can receive direction and timing input to resolve a swipe pattern, a tracked user's hand without a device can perform movements (e.g., through thumb movement against the side of the user's index finger) to form a swipe pattern, etc.

A swipe segment can be touch input representative of movement between two points (e.g., a starting point and an finishing point). Several swipe segments can be combined to form a user's swipe motion. For example, the finishing point of a previous swipe segment can be the starting point of a next swipe segment. Based on the mapping between the locations of trackpad touch input and the locations of an indicator on the virtual keyboard, the path of a first swipe segment can include two or more alphanumeric characters (e.g., included on the path between the starting point and finishing point), the path of a next swipe segment can also include two or more alphanumeric characters, and additional swipe segments can continue until the end of a user's swipe motion (e.g., the user lifts her finger off the trackpad, allows the joystick to remain in a center position for a threshold time, or lifts her thumb from touching her index finger). An entire swipe motion can form a path that includes several alphanumeric characters. Element selector 436 can resolve the path of a swipe motion (according to the track pad to indicator mapping) into a combination of alphanumeric characters, such as a word, number, or other suitable combination of characters, using predictive model(s) 438.

In some implementations, element selector 436 can resolve an initial alphanumeric character selection from a virtual keyboard using user gaze input. One or more predictive model(s) 438 (e.g., machine learning model, an algorithm, or other suitable model) can be configured to receive a user's tracked user gaze input and predict an element that the user intends to select using the tracked user gaze. Element selector 436 can then resolve additional alphanumeric characters, a word, and/or combination of characters according to received input in a modality associated with a user's hand input (e.g., trackpad input that corresponds to a swipe motion). For example, element selector 436 can resolve the combination of characters according to the first selection (e.g., selected using gaze input) along with the swipe segment(s) that select the remaining characters.

Predictive model(s) 438 can predict element selections or combinations of element selections, such as the selection of an alphanumeric character and/or the selection of a combination of alphanumeric characters. One or more predictive model(s) 438 can be configured to receive a user's tracked user gaze input and predict an element from a virtual interface (e.g., alphanumeric character from a virtual keyboard) that the user intends to select using the tracked user gaze. The model can be trained with training data that includes example instances of tracked user gaze input and labels of selected alphanumeric characters.

One or more predictive model(s) 438 can be configured to receive a swipe segment (relative to element locations on the virtual keyboard) or combination of swipe segments and predict one, two, or a combination of alphanumeric characters for the swipe pattern. For example, predictive model(s) 438 can be used to match current swipe segment(s) to known swipe segments associated with predetermined characters and/or sequences of characters. In another example, predictive model(s) 438 can include a language model that stores character sequences and/or words in association with usage probabilities. The language model can be used to configure predictive model(s) 438 and/or select among outputs generated by predictive model(s) 438. Predictive model(s) 438 can include any other suitable character prediction models known to one of ordinary skill in the art.

In some implementations, user gaze input is used to select a first character from a virtual keyboard and hand input (e.g., touch input) is used to select subsequent characters. When predictive model(s) 438 predict character(s) for a swipe segment, the input can include the touch input representative of the swipe on the virtual keyboard and the initial selected character. For example, predictive model(s) 438 can predict the subsequent character selections according to the swipe input given the first character selection.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
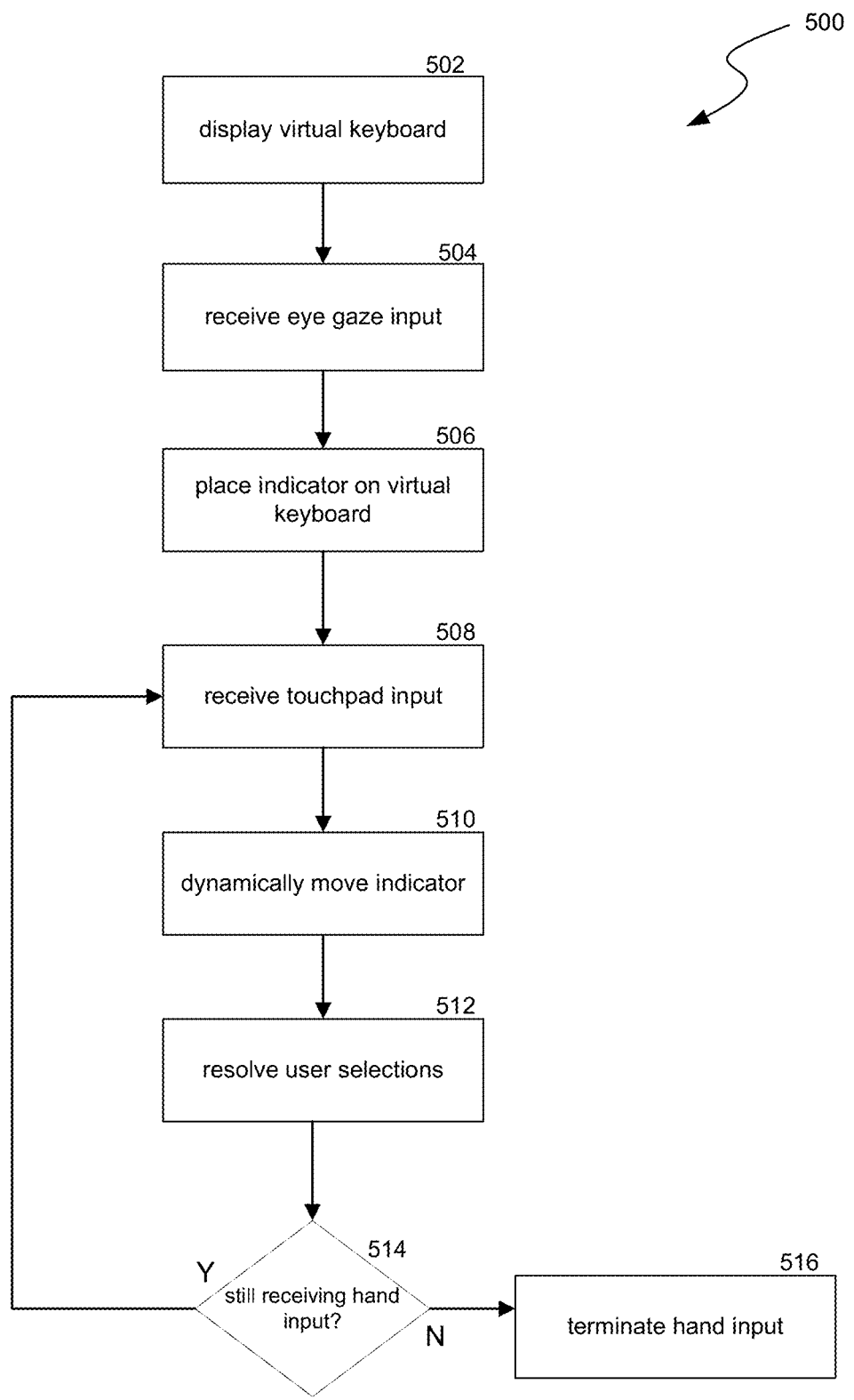
FIG. 5 is a flow diagram illustrating a process used in some implementations of the present technology for receiving input in an artificial reality environment using multiple modalities.

FIG. 5 is a flow diagram illustrating a process 500 used in some implementations for receiving input in an XR environment using multiple modalities. In some implementations, process 500 can be performed by an application or operating system of an XR system to receive input from a user. The input received from the user can configure the application, operating system, any other element of the XR system, or be communicated to any other suitable computing device.

At block 502, process 500 can display a virtual keyboard in an XR environment. For example, an XR device can include a display component that displays a virtual keyboard to a user. The virtual keyboard can include alphanumeric characters arranged as elements. The virtual keyboard can be displayed in the XR environment at a distance in front of the user such as to appear three feet from the user.

At block 504, process 500 can receive user gaze input in relation to the virtual keyboard. Input from one or more sensors (e.g., cameras, accelerometers, other wearable sensors, LiDAR or other time-of-flight systems, and the like) can be used to track a user's gaze (which may be a combination of eye position and head position) relative to displayed elements of the virtual keyboard (e.g., alphanumeric characters).

At block 506, process 500 can resolve the user gaze input to place an indicator on the virtual keyboard. For example, the indicator can be placed at a two-dimensional coordinate on the virtual keyboard that corresponds to the user gaze input. In some implementations, the user gaze input can be projected onto the virtual keyboard (e.g., as a vector projection according to the tracked user gaze that intersects with the displayed virtual keyboard) and the indicator can be placed at the projected location. In some implementations, an initial touch input received at a controller device (or other hand input through controller or hand tracking) triggers the placement of the indicator. The gaze input used to place the indicator can represent the user's gaze at the time of the initial touch input or proximate to the time of the initial touch input (e.g., a threshold amount of time before or after the initial touch input). The placed indicator can be displayed at the virtual keyboard.

In some implementations, at block 506 process 500 can resolve the user gaze input to determine a first selection from the virtual keyboard and place the indicator on the virtual keyboard at the first selection. For example, the user gaze input can be resolved to select an element from the virtual keyboard. In some implementations, an initial touch input received at a controller device (or other hand input through controller or hand tracking) triggers the resolution of the first selection. The gaze input used to resolve the first selection can represent the user's gaze at the time of the initial touch input or proximate to the time of the initial touch input (e.g., a threshold amount of time before or after the initial touch input). Implementations place an indicator at the selected element of the virtual keyboard. For example, the indicator can be a cursor placed at or proximate to (e.g., a threshold distance from) the selected element (e.g., alphanumeric character).

At block 508, process 500 can receive user hand input as a swipe segment, with a starting point and a finishing point, across a surface of a controller device. For example, the controller device can include a trackpad and the user hand input can be touch input sensed on the surface of the trackpad. The touch input can include a swipe segment with a starting point and a finishing point. In some cases, the starting point can be the initial touch point or the finishing point of a previous segment and the finishing point can be the current location of the user's input—e.g., as the user continues a straight or curved input—a change in direction of the input, or a point where the user stopped providing input (e.g., lifter her finger off the input device). Some implementations include a swipe pattern that includes several swipe segments in combination.

When the user hand input (e.g., touch input) is initially sensed, the starting point of the swipe segment can be mapped to the placed indicator (e.g., triggered by the initiation of the user hand input). For example, the relative location of the initial touch input at the trackpad can be mapped to the relative location of the indicator on the virtual keyboard.

At block 510, process 500 can dynamically move the indicator on the virtual keyboard according to the relative positions of the starting point and the finishing point on the surface of the controller device. For example, the indicator can be dynamically moved from its initial placement according to sensed movement of the user's touch input from the starting point along the relative course of user input movement. The relative positions of the starting point and the finishing point can represent touch input that moves over time, and the indicator can be dynamically moved according to this touch input. The dynamic movement of the indicator can be displayed to the use at the virtual keyboard.

At block 512, process 500 can resolve the swipe segment into two or more selections from the virtual keyboard according to the relative positions of the starting point and the finishing point. For example, one or more predictive models can receive the touch input representative of the swipe segment on the virtual keyboard and output a prediction for one or more characters selected by the swipe segment. In some implementations, key points in the swipe pattern (e.g., changes in direction, start and stop points of swipe segments, points where the user changes swipe speed, etc.) can be used to identify which corresponding points on the virtual keyboard indicate intended input characters. In some implementations, block 512 can be performed for the entire swipe input (e.g., for the full set of swipe segments) following block 514. For example, a pattern defined by the set of swipe segments can be provided to a machine learning model or can be used to match to patterns for known words to resolve the user's intended input.

In some implementations, at block 512 process 500 can resolve the swipe segment into two or more selections from the virtual keyboard according to a first selection (e.g., selected according to user gaze input) and the relative positions of the starting point and the finishing point. For example, one or more predictive models can receive the touch input representative of the swipe segment on the virtual keyboard and the first selection (e.g., character), and output a prediction for one or more characters selected by the swipe segment.

At block 514, process 500 can determine whether hand input is still being received. For example, process 500 can determine whether an input signal is received from the trackpad of a controller device (yes at block 514) or the user has lifted her finger off the trackpad (no at block 514). In other implementations, other signals can be used to identify an end to the swipe input such as a joystick remaining in a center position for a threshold time (e.g., 0.1 or 0.5 seconds) or the user lifting her thumb from contact with another finger. If touch input is still being received, process 500 can return to block 508 to receive the touch input. Process 500 can continue to block 510 and block 512 such that the indicator can be dynamically moved according to the touch input (e.g., continued swipe input) and additional selections from the virtual keyboard can be resolved (e.g., alphanumeric characters selections can be resolved for the continued swipe).

At block 514, when process 500 determines that touchpad input is no longer being received, process 500 can progress to block 516. At block 516, process 500 can terminate the touch input session. For example, during a touch input session the displayed cursor can be dynamically moved according to the touch input. After the termination of the touch input session the cursor can be: a) removed from the virtual keyboard, b) placed at a default location, c) dynamically moved according to input in another modality (e.g., user gaze input).

In some implementations, at block(s) 512 and 514 combinations of character selections can generate character sequences corresponding to the user's input, such as words, numbers, sentences, and any other suitable combination of characters. For example, prediction models can generate these character sequences using the characters resolved according to the user input, by matching input patterns to known word patterns, etc. Process 500 can translate input from a user in multiple modalities to alphanumeric characters such that the user can "type" in the XR environment.

Figure 6:
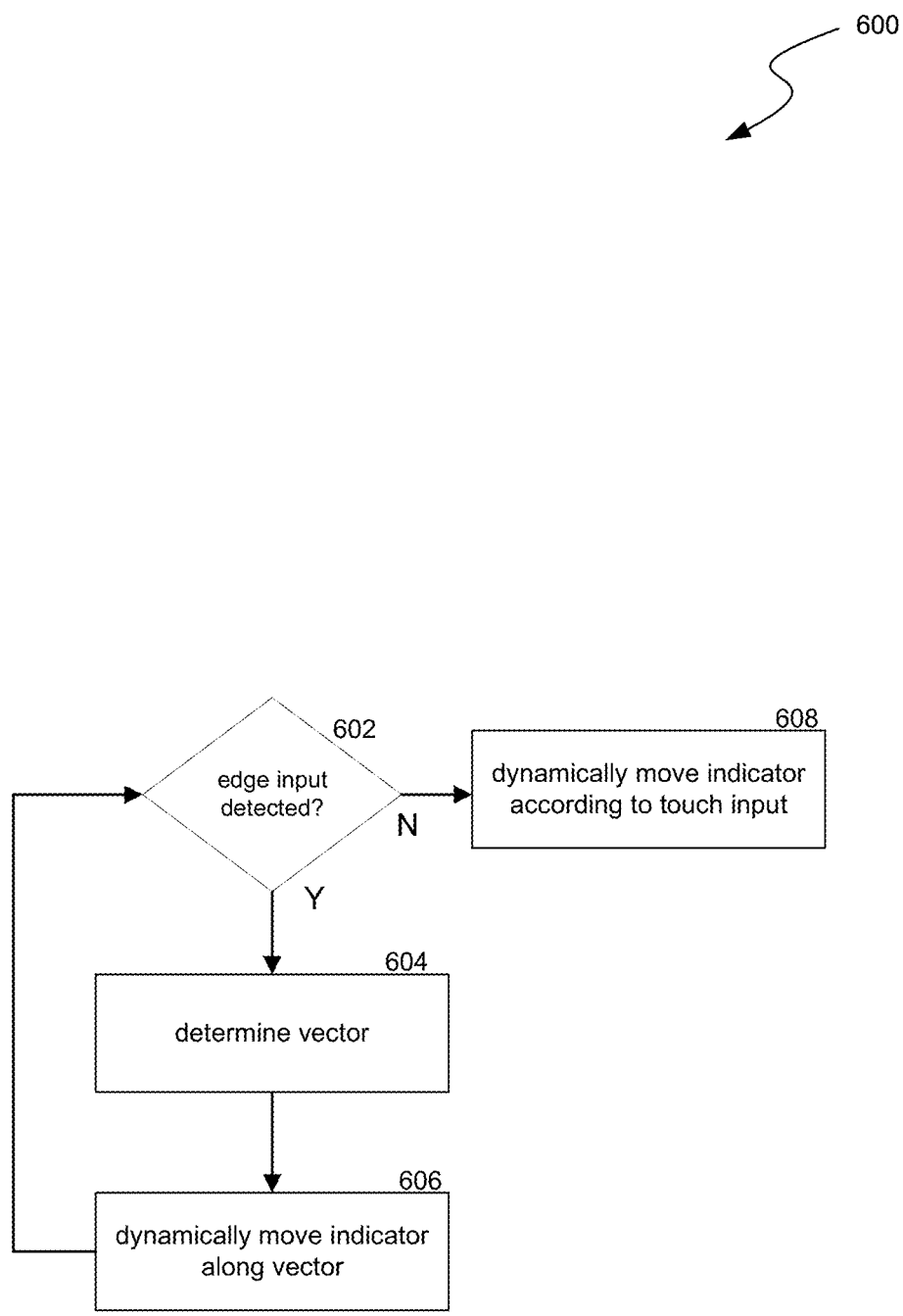
FIG. 6 is a flow diagram illustrating a process used in some implementations of the present technology for receiving touchpad edge input in an artificial reality environment.

In some implementations, while providing input in some modalities, such as touch input, a user can encounter limitations that impact the user's ability to interact with the virtual keyboard. FIG. 6 is a flow diagram illustrating a process used in some implementations of the present technology for receiving touchpad edge input in an XR environment. In some implementations, process 600 can be performed by an application or operating system of an XR system to receive input from a user. The input received from the user can configure the application, operating system, any other element of the XR system, or be communicated to any other suitable computing device.

Implementations of process 600 can operate in combination with process 500 of FIG. 5 to receive touch input from a user. In some implementations, process 600 can be performed in conjunction with a controller device with a trackpad or joystick for receiving touch input from a user. In other cases, process 600 can be performed with a user entering directional input through hand tracking—e.g., moving her thumb while in contact with the side of her index finger.

At block 602, process 600 can determine whether edge input is detected. For example, edge input can be touch input received at the edge of a trackpad, a joystick input at the full range of the joystick motion, or the user extending her thumb into an edge of the thumb's range of movement while in contact with her index finger. For example, a boundary can be defined at the edges of a trackpad, and edge input can be detected when touch input is received within the boundary. When edge input is detected, process 600 progresses to block 604.

At block 604, process 600 can determine a vector for swipe and/or indicator movement during the edge input. For example, the vector can be defined based on the edge input location relative to the trackpad, the joystick input relative to a center position, or a thumb tip position relative to an initial contact position with the index finger. For example, edge input in the top right of the trackpad can correspond to a defined vector slanted up and to the right, edge input in the center right of the trackpad can correspond to a defined vector pointed to the right (e.g., without a slant up or down), and edge input in the bottom right of the trackpad can correspond to a defined vector slanted down and to the right. In another example, the vector can be determined based on the touch input representative of the user's touch motion prior to arriving at the edge boundary. In another example, the edge input can be input from a joystick, and the vector can be defined based on the angle of the joystick at the full range of motion. In yet another example, the edge input can be tracked finger(s) movement at the edge of a range of motion (e.g., range of motion when the thumb is in contact with the index finger), where the vector can be defined based on the location of the user's finger(s) relative to a center of the range of motion. In some implementations, the vector can be defined to simulate indicator movement according to input (e.g., touch input, joystick input, tracked finger input) directly previous in time to the detected edge input.

At block 606, process 600 can dynamically move the indicator along the vector. For example, while the user holds the edge input (e.g., keeps her thumb touching the edge of the trackpad), the indicator can be dynamically moved in a constant motion along a path defined by the determined vector.

In some implementations, the dynamically moved indicator represents the swipe used to select characters from the virtual keyboard. For example, the edge input received at the trackpad is not representative of a user's swipe because the edge input itself is stationary and does not reflect the indicator movement. Accordingly, the touch input can be augmented to represent the dynamic indicator movement so that the touch input is representative of the indicator movement on the virtual keyboard. In this example, the augmented touch input can correspond to the indicator movement displayed to the user and thus reflect the user's desired character selections.

After block 606, process 600 can return to block 602. The indicator can be dynamically moved along the vector (or another determined vector if the edge input changes) until the edge input is no longer detected at block 602. When the edge input is no longer detected, process 600 progresses to block 608.

At block 608, process 600 can dynamically move the indicator according to touch input received from the user. For example, when edge input is no longer detected the user may provide touch input on the trackpad in the form of swipe segment(s), and the indicator can be dynamically moved according to the swipe segment(s) (e.g., touch input movement between the starting point and finishing point of a swipe segment). In another example, the user may no longer provide touch input on the trackpad when edge input is not detected. In this example, the cursor may no longer be displayed, may be displayed at its last location, may be moved to a default location, or may be controlled by another input modality (e.g., user gaze).

Other implementations can provide additional functionality alternative to or in combination with the edge touch functionality of FIG. 6. For example, the indicator can be displayed at the virtual keyboard with an effect (e.g., fade out, squish, color change, or the like) when a user's touch input is proximate to a trackpad edge. In another example, tracked gaze input during swipe touch input can be used to augment the touch input. The tracked gaze input can increase the speed of indicator movement on the virtual keyboard when the touch input and gaze input are directed toward a same/similar virtual keyboard location. The tracked gaze input can also be used to continue indicator movement towards a location of the virtual keyboard when a trackpad edge is reached (e.g., edge input is detected). For example, similar to the function of FIG. 6, a vector can be determined for the edge input and the indicator can be moved along the vector when the user's tracked gaze on the virtual keyboard is consistent with the vector. Additional details on edge input are provided below in relation to FIG. 8. Process 600 can repeat as the user continues to provide swipe input.

Figure 7:
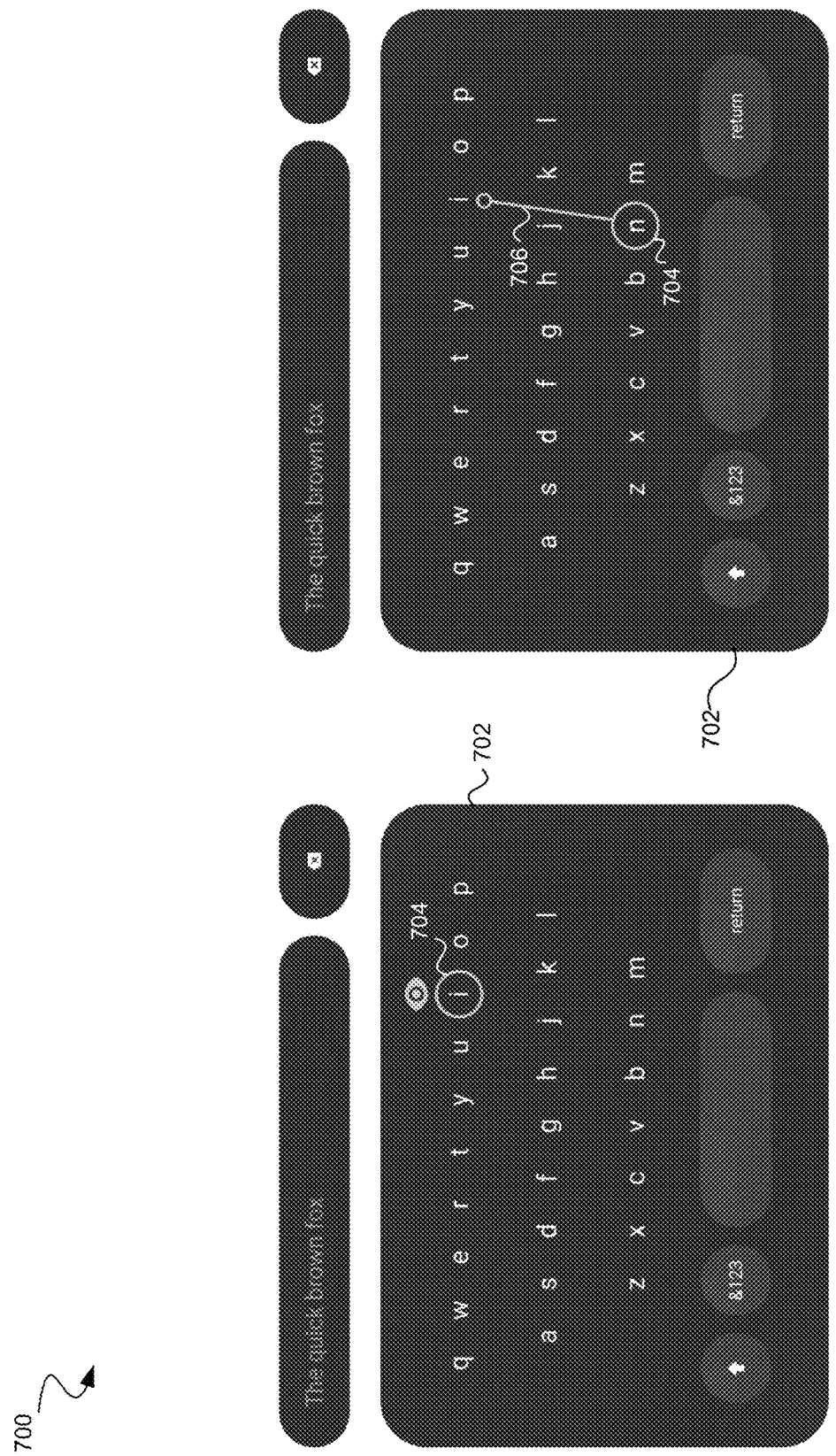
FIG. 7 is a diagram illustrating a virtual keyboard and a received swipe segment.

FIG. 7 is a diagram illustrating a virtual keyboard and a received swipe segment. FIG. 7 depicts diagram 700, virtual keyboard 702, indicator 704, and swipe segment 706. Virtual keyboard 702 can be an object displayed in an artificial reality environment, e.g., in front of the user by an artificial reality device when text input is designated. Diagram 700 illustrates that indicator 704 is placed on virtual keyboard 702 initially at the "i" alphanumeric character element according to a user's gaze input. Next trackpad input is used to dynamically move indicator 704. The gaze input and placed indicator 704 represents a mapping between the placement of indicator 704 on virtual keyboard 702 and an initial touch location on the trackpad. Swipe segment 706 and the movement of indicator 704 across virtual keyboard 702 is caused by the touch input received at the trackpad. The touch input dynamically moves indicator 704 based on the initiated mapping.

Diagram 700 can represent a virtual keyboard displayed to a user while the user provides input in different modalities. For example, the user may be displayed indicator 704 placed at the "i" alphanumeric character element in response to the user's gaze input and an initial touch on a trackpad. The user can then be displayed the dynamic movement of indicator 704 and the swipe pattern (e.g., starting with swipe segment 706 and continuing to add swipe segments in response to the user's touch input at the trackpad). The virtual keyboard can be displayed to the user in an XR environment at a distance in front of the user's face to support gaze cursor placement.

Figure 8:
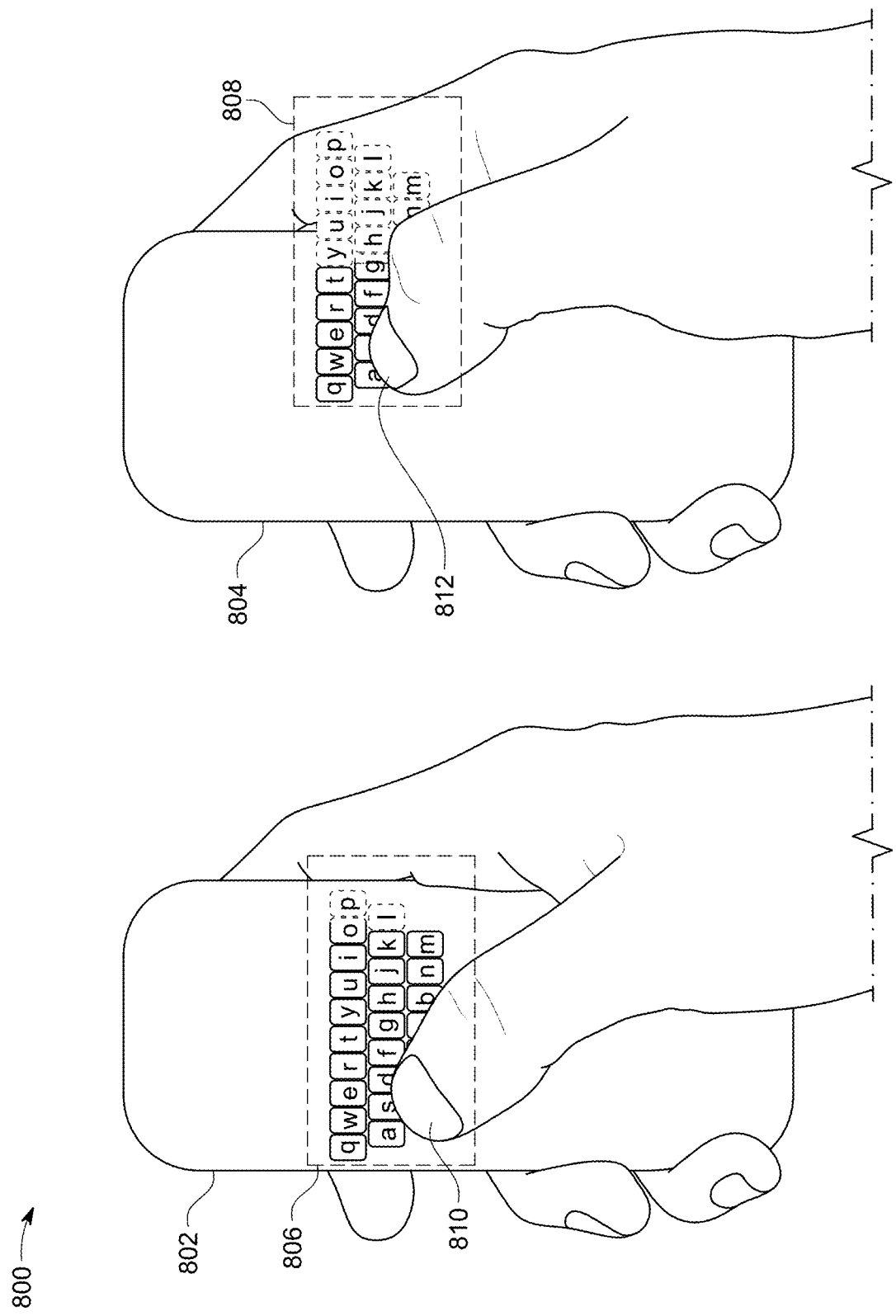
FIG. 8 is a diagram illustrating visual alignments according to different mappings between a controller device and virtual keyboard.

FIG. 8 is a diagram illustrating visual alignments according to different mappings between a controller device and virtual keyboard. FIG. 8 depicts controller devices 802 and 804 and visual alignments 806 and 808. Implementations include an ad-hoc mapping between relative touch locations on a trackpad and indicator placement on a virtual keyboard. Due to the ad-hoc nature of the mapping, certain initial user touches can cause mappings that present challenges.

For example, controller device 802 depicts an initial touch 810 on the left side of the device while controller device 804 depicts an initial touch 812 in the middle of the device, while in each case the user was looking at the "z" key on a corresponding virtual keyboard. The corresponding visual alignments 806 and 808 (not necessarily shown to the user, but which may be provided in a display of the controller device or as a virtual object overlay by an associated artificial reality device) are dependent on the indicator placement at the virtual keyboard (placed according user gaze and, in some implementations, resolved character selection) and the resulting mapping generated (e.g., mapping between indicator placement on the virtual keyboard and initial touch location on controller devices 802 and 804). For example, both of visual alignments 806 and 808 illustrate indicator placement that maps the "z" key, on which the user was focused at the time the user touched the trackpad, under the initial user touches 810 and 812, respectively.

Controller device 802 and the initial touch 810, which was on the left side of the device, present a minor challenge for interfacing with the virtual keyboard. A portion of the virtual keyboard depicted by visual alignment 806 is unreachable on the trackpad (e.g., characters 'p' and 'l'). Controller device 804 and the initial touch 812, which was in the middle of the device, present a greater challenge for interfacing with the virtual keyboard. A large portion of the virtual keyboard depicted by visual alignment 808 is unreachable on the trackpad (e.g., almost half of the characters of the virtual keyboard).

Different techniques can be used to mitigate these challenges. For example, the controller device can be held by the user in landscape mode (e.g., an instruction can be provided to hold the controller device in landscape mode) to provide more trackpad real estate for the virtual keyboard. In another example, edge input functionality can be implemented such that indicator movement can continue even when the edge of the trackpad is reached (as described with reference to FIG. 6). Touch input at the edge of the trackpad can cause indicator movement according to a defined vector. This edge input technique can be used to reach virtual keyboard characters that would be unreachable absent the technique. For example, the unreachable portions of the virtual keyboard illustrated in visual alignment 808 could be reached using the edge input functionality described in FIG. 6.

In some implementations, edge input can realign a mapping by altering the relative mapping between the touch location on the trackpad and the indicator location on the virtual keyboard. For example, the edge input functionality causes movement of the cursor on the virtual keyboard that does not correspond to movement of the user's touch on the trackpad. The relative mapping for the location at the edge of the trackpad that receives the user's edge input is dynamically altered by the indicator movement on the virtual keyboard. Consider the virtual keyboard illustrated in visual alignment 808. The user may provide edge input at the edge of controller device 804 until the indicator reaches character 'p' on the virtual keyboard. This edge input can shift the mapping between the trackpad of controller device 804 and the virtual keyboard until the right-side edge of the trackpad reaches the character 'p' of the virtual keyboard. This realignment achieves greater reachability of the virtual keyboard characters and mitigates the issues caused by the original mapping illustrated by visual alignment 808.

Other implementations can provide additional functionality alternative to or in combination with the mapping realignment functionality. For example, the displayed virtual keyboard can be augmented with an overlay of the touchpad mapping and/or an overlay of the border of the touchpad mapping (once the mapping is established by initiation of touch input). This overlay can provide feedback to the user such that a mitigation technique can be used to remedy a problematic mapping and/or to support a natural swipe motion.

In another example, feedback (e.g., haptic feedback, sound, flash, displayed indicator, or other suitable feedback) can be provided by a controller device to the user (or the AR device to the user) when a user's touch generates a problematic mapping. For example, the portion of the virtual keyboard that is unreachable according to the initiated trackpad mapping can be determined, and when the portion meets a criteria (e.g., percentage threshold) the feedback can be provided to the user. The feedback can encourage the user to initiate touch sessions at advantageous locations. In an example, an initial touch that generates a mapping represented by visual alignment 808 of FIG. 8 can trigger haptic feedback to the user.

Implementations can also vary how an indicator moves on a virtual keyboard in response to touch input on a trackpad. For example, an implemented motion ratio can be mapped 1:1 (e.g., touch input that performs a full horizontal traversal of the trackpad can correspond to a full horizontal traversal of the virtual keyboard). In another example, the motion ratio can be 1:2 (e.g., touch input that performs a half horizontal traversal of the trackpad can correspond to a full horizontal traversal of the virtual keyboard), 2:1, 1:1.5, or any other suitable motion ratio. In some implementations, the motion ratio can be dynamic according to the mapping generated by the user's initial touch. For example, a default motion ratio (e.g., 1:1) can be used for a good mapping, however the default ratio can be changed (e.g., to 1:2 or 1:1.5) when a problematic mapping (e.g., a mapping that renders a large portion of the virtual keyboard unreachable using a default ratio) is initiated.

In another example, indicator movement on a virtual keyboard according to touch input can be controlled linearly. Given the above example of a 1:1 motion ratio, the linear control causes touch input that performs a full horizontal traversal of the trackpad to move the indicator across a full horizontal traversal of the virtual keyboard. In some implementations, a touch velocity (or acceleration) can be used to augment indicator movement. For example, the indicator movement can increase in velocity based on touch input velocity (e.g., determined finger velocity).

In some implementations, user gaze input can be used for virtual keyboard character selections while touch input is used to trigger the selection. For example, a touch sensed on a controller device (e.g., trackpad) can trigger element selection such that the given virtual keyboard character targeted by the user gaze at the time of the touch input is selected. This technique implements user gaze as the mechanism for targeting virtual keyboard elements and touch input as the mechanism for triggering selection of a targeted element. A sequence of characters can be selected using this technique to generate words, numbers, character sequences, and the like.

Figure 9:
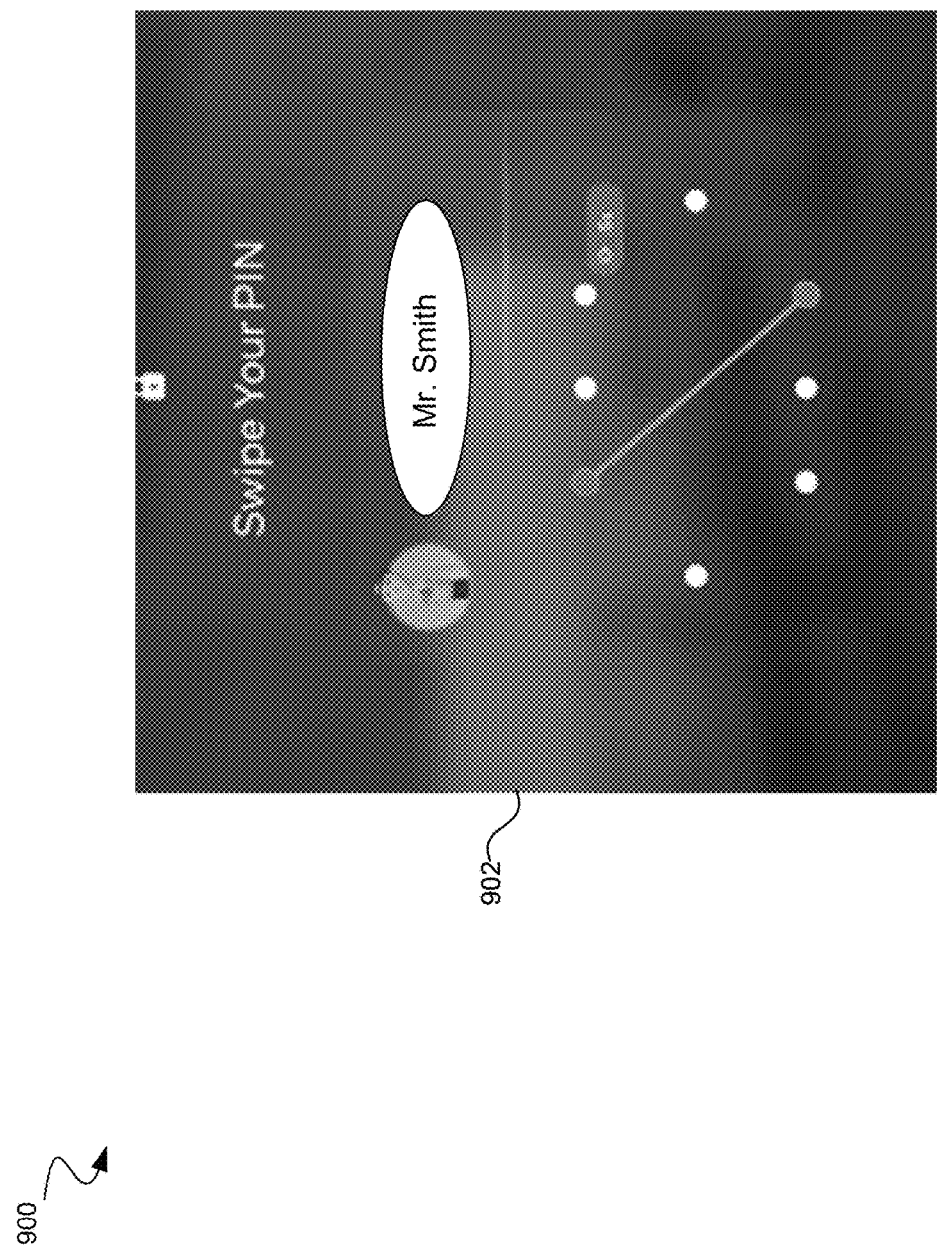
FIG. 9 is a diagram illustrating a virtual interface for receiving a swipe pattern.

Implementations can also use the gaze and hand input modalities to receive other types of input, such as a pattern. FIG. 9 is a diagram illustrating a virtual interface for receiving a pattern. FIG. 9 depicts diagram 900 and interface display 902. Interface display 902 can be displayed to a user in an XR environment, such as at a distance in front of the user's face. Interface display 902 includes several elements (e.g., dots) arranged in a shape. The user's gaze can be tracked (e.g., using a camera, accelerometer, wearable sensors, or other suitable sensors) to identify an initial target element. Hand input (e.g., touch input at a trackpad, joystick input, tracked finger input) can then be received to initiate selection of the target element. For example, an element targeted by a user's gaze when the initial hand input is detected can be selected. In some implementations, the detected touch input can also place an indicator (e.g., cursor) at the selected element. For example, the indicator can be placed on virtual interface 902 and dynamically moved by the user's hand input.

The detection of the hand input and placement of the cursor achieves a mapping between the indicator and the hand input. For example, the hand input can be touch input on a trackpad and the mapping can map the relative location of the touch input on the trackpad to relative location of the placed indicator at virtual interface 902. The indicator can then be dynamically moved by the hand input. The user's hand input can be swipe input that generates a path that includes two or more of the elements on interface display 902 (given the relative mapping that maps hand input to indicator location). The swipe input can be resolved along with the initial selected element to generate a pattern. For example, the swipe path can include a sequence of element selections that form a pattern. In some implementations, the pattern can be a lock pattern for a device or other suitable security protocol for accessing a device or application. In some implementations, the hand input that triggers initial element selection, causes indicator placement, and generates a path that forms the pattern can be joystick input, tracked finger input, or any other suitable hand input.

Figure 10:
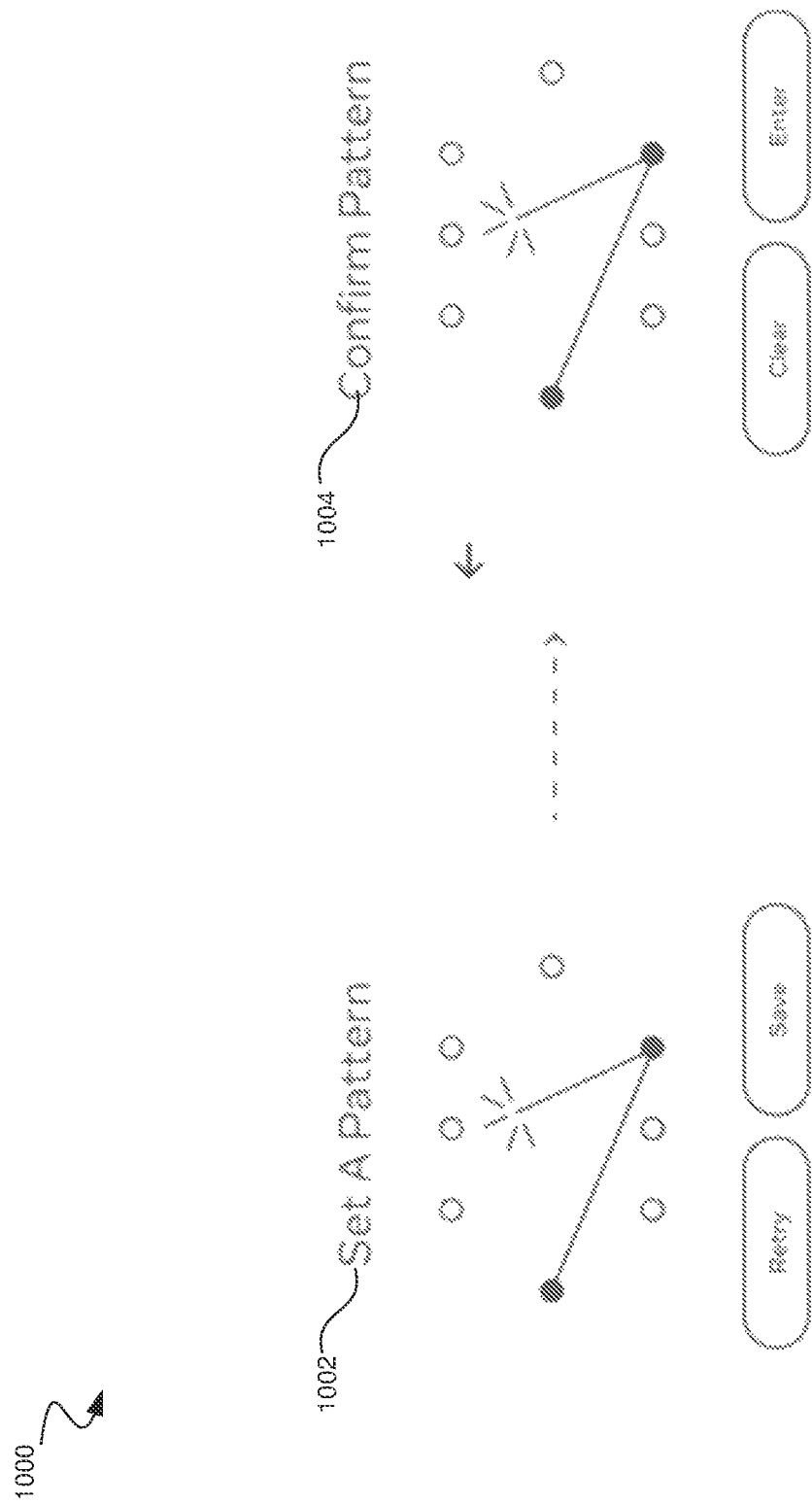
FIG. 10 is a diagram illustrating a virtual interface for setting a swipe pattern.

FIG. 10 is a diagram illustrating a virtual interface for setting a pattern. FIG. 10 depicts diagram 1000, set pattern interface 1002, and confirm pattern interface 1004. For example, user gaze input and user hand input can be used to select elements depicted by interface display 902 of FIG. 9. The selections can be displayed to the user by set pattern interface 1002. Similar to the functionality described with reference to FIG. 9, hand input can be used to move an indicator and select portions (e.g., buttons) on set pattern interface 1002. The user can save the element selections or retry the selections (if the selections are incorrect or not desired by the user). Once the pattern is set, the pattern can be displayed to the user by confirm pattern interface 1004. If the user is satisfied with the pattern, the user can enter the pattern. Otherwise, the user can clear the pattern and retry the pattern input.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for receiving input in an artificial reality environment using multiple modalities, the method comprising:
   displaying a virtual keyboard in an artificial reality environment;
   receiving user gaze input in relation to the virtual keyboard;
   receiving initial user touch input at a surface of a controller device, wherein the initial user touch input generates an ad-hoc mapping between the surface of the controller device and the virtual keyboard;
   determining that the ad-hoc mapping meets an alignment criteria;
   displaying, in response to the initial user touch input, an indicator at a location on the virtual keyboard according to the received user gaze input;
   receiving additional user touch input as a swipe segment, with a starting point and a finishing point, across a surface of a controller device, wherein the starting point of the swipe segment is mapped to the placed indicator;
   dynamically moving the indicator on the virtual keyboard according to the relative positions of the starting point and the finishing point on the surface of the controller device;
   resolving the swipe segment into two or more selections from the virtual keyboard according to the relative positions of the starting point and the finishing point;
   dynamically removing the indicator from the virtual keyboard in response to no longer receiving the touch input at the controller device;
   receiving, after the indicator is removed from the virtual keyboard, second initial user touch input at a surface of the controller device, wherein the second initial user touch input generates an other ad-hoc mapping between the surface of the controller device and the virtual keyboard;

determining that the other ad-hoc mapping does not meet the alignment criteria; and triggering, in response to the determining that the other ad-hoc mapping does not meet the alignment criteria, visual user feedback in relation to the virtual keyboard or haptic user feedback via the controller device.

2. The method of claim 1, wherein there is no mapping of areas of the surface of the controller device to portions of the virtual keyboard prior to receiving the initial user touch input that controls the indicator movement.

3. The method of claim 1, wherein the controller device comprises a trackpad.

4. The method of claim 3, further comprising:
detecting that edge touch input is received at an edge of the trackpad as a part of the additional user touch input, wherein the edge touch input is stationary for a threshold duration of time; and
dynamically moving the indicator along a vector that corresponds to the edge touch input over the duration of time.

5. The method of claim 4, wherein the vector is defined according to at least an edge location on the trackpad where the edge touch input is received.

6. The method of claim 4, wherein edge touch input is detected when touch input is received at a predetermined edge region of the trackpad.

7. The method of claim 1, wherein resolving the swipe segment according to the relative positions of the starting point and the finishing point comprises using a predictive text model to generate one or more match probabilities for candidate selections of alphanumeric characters, wherein the swipe segment is resolved using the generated one or more match probabilities.

8. A computing system for receiving input in an artificial reality environment using multiple modalities, the computing system comprising:
one or more processors; and
one or more memories storing instructions that, when executed by the one or more processors, cause the computing system to perform a process comprising:
displaying a virtual keyboard in an artificial reality environment;
receiving user gaze input in relation to the virtual keyboard;
receiving initial user touch input at a surface of a controller device, wherein the initial user touch input generates an ad-hoc mapping between the surface of the controller device and the virtual keyboard;
determining that the ad-hoc mapping meets an alignment criteria;
resolving, in response to the initial user touch input, the user gaze input to determine a first selection from the virtual keyboard and placing a displayed indicator on the virtual keyboard at the first selection;
receiving additional user touch input with a starting point and a finishing point, via a controller device, wherein the starting point is mapped to the indicator placed at the first selection;
dynamically moving the indicator on the virtual keyboard according to the relative positions of the starting point and the finishing point;
resolving the user touch input into two or more selections from the virtual keyboard according to the first selection and the relative positions of the starting point and the finishing point;

dynamically removing the indicator from the virtual keyboard in response to no longer receiving the touch input at the controller device;
receiving, after the indicator is removed from the virtual keyboard, second initial user touch input at a surface of the controller device, wherein the second initial user touch input generates an other ad-hoc mapping between the surface of the controller device and the virtual keyboard;
determining that the other ad-hoc mapping does not meet the alignment criteria; and
triggering, in response to the determining that the other ad-hoc mapping does not meet the alignment criteria, visual user feedback in relation to the virtual keyboard or haptic user feedback via the controller device.

9. The computing system of claim 8, wherein there is no mapping of areas of the surface of the controller device to portions of the virtual keyboard prior to receiving the initial user touch input that controls the indicator movement.

10. The computing system of claim 8, wherein the controller device comprises a trackpad.

11. The computing system of claim 10, further comprising:
detecting that edge touch input is received at an edge of the trackpad, wherein the edge touch input is stationary for a threshold duration of time; and
dynamically moving the indicator along a vector that corresponds to the edge touch input over the duration of time.

12. The computing system of claim 11, wherein the vector is defined according to at least an edge location on the trackpad where the edge touch input is received.

13. The computing system of claim 8, wherein resolving the swipe segment according to the first selection and the relative positions of the starting point and the finishing point comprises using a predictive text model to generate one or more match probabilities for candidate selections of alphanumeric characters, wherein the swipe segment is resolved using the generated one or more match probabilities.

14. A non-transitory computer-readable storage medium storing instructions that, when executed by a computing system, cause the computing system to perform a process for receiving input in an artificial reality environment using multiple modalities, the process comprising:
displaying a virtual keyboard in an artificial reality environment;
receiving user gaze input in relation to the virtual keyboard;
receiving initial user touch input at a surface of a controller device, wherein the initial user touch input generates an ad-hoc mapping between the surface of the controller device and the virtual keyboard;
determining that the ad-hoc mapping meets an alignment criteria;
placing, in response to the initial user touch input, an indicator at a location on the virtual keyboard according to the received user gaze input;
receiving additional user touch input with a starting point and a finishing point, via a controller device, wherein the starting point is mapped to the indicator placed at the first selection;
dynamically moving the indicator on the virtual keyboard according to the relative positions of the starting point and the finishing point;

resolving the user touch input into two or more selections from the virtual keyboard according to the relative positions of the starting point and the finishing point; and dynamically removing the indicator from the virtual keyboard in response to no longer receiving the touch input at the controller device;

receiving, after the indicator is removed from the virtual keyboard, second initial user touch input at a surface of the controller device, wherein the second initial user touch input generates an other ad-hoc mapping between the surface of the controller device and the virtual keyboard;

determining that the other ad-hoc mapping does not meet the alignment criteria; and triggering, in response to the determining that the other ad-hoc mapping does not meet the alignment criteria, visual user feedback in relation to the virtual keyboard or haptic user feedback via the controller device.

15. The method of claim 4, wherein, the initial user touch input at the trackpad initiates an ad-hoc mapping that maps the starting point of the swipe segment to the indicator placed on the virtual keyboard, and the ad-hoc mapping is dynamically altered in response to the indicator movement that corresponds to the detected edge touch input.

16. The method of claim 1, wherein a motion ratio defines the dynamic indicator movement on the virtual keyboard relative to positions of the starting point and the finishing point on the surface of the controller device, and the motion ratio is greater than one to one.

17. The method of claim 1, wherein the determining that the other ad-hoc mapping does not meet the alignment criteria is based on comparing an alignment between the surface of the controller device and the virtual keyboard with the alignment criteria, wherein the alignment is created by the other ad-hoc mapping.

18. The method of claim 17, wherein the alignment criteria comprises a reachability metric with respect to the alignment between the surface of the controller device and the virtual keyboard.

19. The method of claim 1, wherein visual user feedback in relation to the virtual keyboard is triggered in response to the determining that the other ad-hoc mapping does not meet the alignment criteria, and the visual user feedback comprises an overlay indicative of an alignment between the surface of the controller device and the virtual keyboard, where in the alignment is created by the other ad-hoc mapping.

20. The method of claim 1, wherein the alignment between the surface of the controller device and the virtual keyboard achieved by the ad-hoc mapping corresponds to a first portion of the virtual keyboard that is unreachable, and the alignment between the surface of the controller device and the virtual keyboard achieved by the other ad-hoc mapping corresponds to a second portion of the virtual keyboard that is unreachable.

* * * * *